United States Patent [19]

Van Hijfte et al.

[11] 4,150,965
[45] Apr. 24, 1979

[54] AMMONIUM NITRATE CONTAINING FERTILIZER PELLETS AND A PROCESS OF MAKING SAME HAVING A COATING OF $C_{12}$–$C_{18}$ ALKYL AMINE(S) AND AN OVERCOAT OF MINERAL OIL

[75] Inventors: Willy H. P. Van Hijfte, Assenede; Rafaël A. J. Goethals, Ertvelde; Anton Niks, Sledderlo bij Genk, all of Belgium; Gerardus F. van der Sijpt, Koewacht, Netherlands

[73] Assignee: Compagnie Neerlandaise de l'Azote (Societe Anonyme), Brussels, Belgium

[21] Appl. No.: 898,331

[22] Filed: Apr. 20, 1978

[30] Foreign Application Priority Data

Apr. 28, 1977 [NL] Netherlands .................... 7704686

[51] Int. Cl.² .................... B01J 2/30; C05C 1/02
[52] U.S. Cl. .................... 71/27; 71/64 E; 427/214
[58] Field of Search .................... 71/27, 64 E, 64 F; 427/220, 221, 214

[56] References Cited

U.S. PATENT DOCUMENTS

| 3,223,518 | 12/1965 | Hansen | 71/64 E |
|---|---|---|---|
| 3,234,006 | 2/1966 | Sawer | 71/64 F |
| 3,276,857 | 10/1966 | Stansbury | 71/64 E |
| 3,342,577 | 9/1967 | Blown | 71/64 F |
| 3,598,563 | 8/1971 | Burch | 71/64 E |
| 3,991,225 | 11/1976 | Blown | 427/214 |

FOREIGN PATENT DOCUMENTS 1354376 5/1974 United Kingdom .................... 71/64 E

*Primary Examiner*—Sam Silverberg
*Attorney, Agent, or Firm*—Scully, Scott, Murphy & Presser

[57] ABSTRACT

Ammonium nitrate containing fertilizer pellets provided individually throughout their entire surface with a uniform and substantially closed coating of $C_{12}$–$C_{18}$ alkylamine(s) in the solid state, and with a thin layer of mineral oil over said coating.

11 Claims, No Drawings

AMMONIUM NITRATE CONTAINING FERTILIZER PELLETS AND A PROCESS OF MAKING SAME HAVING A COATING OF $C_{12}$–$C_{18}$ ALKYL AMINE(S) AND AN OVERCOAT OF MINERAL OIL

This invention relates to ammonium nitrate containing fertilizer pellets having improved properties during storage and transportation, and to a process for making such pellets.

Ammonium nitrate containing fertilizers, both in bags and in bulk, exhibit a strong tendency of caking during storage. When stored in bulk in a humid atmosphere, the pellets lying at the surface of the pile readily absorb moisture, which gradually finds its way deeper into the pile, so that a wet layer is formed, which may be as thick as 5–80 cm, depending on climatological conditions and the duration of storage. The pellets in the wet layer cake together and partly loose their structure, and ultimately the wet layer becomes a stone-hard crust.

It has been proposed to reduce the caking tendency of ammonium nitrate containing fertilizer pellets by spraying the pellets in a rotary coating drum with a mixture of an alkylamine containing 12–18 carbon atoms and a mineral oil. Owing to the rolling and rubbing movement of the pellets in the rotating drum, the mixture of amine and oil is spread over the surface of the pellets, and a more or less uniform coating is produced. The pellets thus treated exhibit a decreased tendency of moisture absorption and caking together, but seldom to the extent that the product is free flowing after prelonged storage. In order to improve the storage properties still further, the pellets are normally dusted with a fine inorganic powder such as kaolin, diatomaceous earth, chalk, either before or after being coated with the mixture of amine and oil. One disadvantage of this procedure is that a dusting product is produced, which is objectionable during such industrial manipulations as repacking, bagging sealing of plastic bags, bulk loading and pneumatic transport.

During the manipulation of loose fertilizer pellets, owing to the pellets rubbing and striking against each other, dust is formed, a fraction of which is so fine that it will float in the air. This fly-dust can be such a burden on the working atmosphere as to cause serious inconvenience to attending personnel. If the pellets have been sprayed with a mixture of amine and oil, the fine fly-dust will contain amine particles liberated by mutual friction of the pellets. In that case the fly-dust may contain up to 5% amine. This amine containing fly-dust causes skin affections and has an irritating effect on the respiratory tract.

It is an object of the present invention to provide ammonium nitrate containing fertilizer pellets which (1) exhibit a greatly reduced tendency of caking, (2) exhibit greatly improved properties when stored in bulk in humid conditions, and (3) exhibit a greatly increased resistance to dusting under conditions of attrition, whereby the product is completely dust-free.

It has been found that this object is achieved if the individual, ammonium nitrate containing fertilizer pellets are provided throughout their entire surface with a uniform and substantially continuous coating of $C_{12}$–$C_{18}$ alkylamine(s) in the solid state and with a thin layer of mineral oil applied over said coating.

According to the present invention, therefore, there are provided ammonium nitrate containing fertilizer pellets having improved properties during storage and transportation, characterized in that the individual fertilizer pellets are provided throughout their entire surface with a uniform and substantially continuous coating of $C_{12}$–$C_{18}$ alkylamine(s) in the solid state and with a thin layer of mineral oil applied over said coating.

The invention also relates to a process for making the fertilizer pellets described, which process is characterized in that ammonium nitrate containing fertilizer pellets are successively coated in a first stage with a uniform and substantially continuous layer of molten $C_{12}$–$C_{18}$ alkylamine(s), cooled in a second stage to a temperature sufficiently low to bring said coating entirely to the solid state, and coated in a third stage with a thin layer of mineral oil.

Preferably, in the first stage, the alkylamine melt is sprayed, in a rotary coating drum, over the fertilizer pellets, the temperature of which is above the melting point of the amine or mixture of amines.

In the process according to the present invention, dusting the pellets with a fine inorganic powder either before or after their being coated with amine and oil is not only entirely superfluous, but even a disadvantage. It has been found that the effect of the process according to the present invention is largely cancelled by the powder adhering to the pellets owing to the dusting treatment.

The fertilizer pellets to which the process according to the present invention can be applied may consist of ammonium nitrate or of mixtures thereof with fillers, such as lime stone or dolomite, for example, 28–35% N ammonium nitrate prills and pellets; 20.5–23% and 26% N calcium ammonium nitrate prills and pellets; mixtures of ammonium nitrate with the same fillers and with magnesium sulphate, for example 20.5% N magnesamon; binary mixtures of ammonium nitrate and ammonium and calcium phosphates, for example, a mixture of monoammonium phosphate and ammonium nitrate (e.g. 20-20-0 and 23-23-0); and ternary mixtures of ammonium nitrate, phosphates and potassium salts, possibly supplemented with each other plant nutrients.

Suitable amines are primary alkylamines, in which the amine group is terminal, and the alkyl group contains 12–18 carbon atoms, preferably in a straight chain. Generally speaking mixtures of such amines will be used. Excellent results were obtained using so-called technical-grade octadecylamine, which is a mixture of unbranched $C_{10}$–$C_{20}$ alkylamines, containig approximately 65% $C_{18}$ alkylamine, approximately 30% $C_{16}$ alkylamine and minor percentages of $C_{12}$ and $C_{14}$ alkylamines.

The amine or mixture of amines is sprayed in the molten state over the fertilizer pellets to be treated, preferably in a rotary coating drum designed so that the pellets are provided throughout their entire surface with a uniform and substantially continuous coating during their passage through the drum.

Preferably the drum used for this purpose is one of the kind described in our co-pending patent application, entitled "Coating drum", filed concurrently herewith, which is incorporated herein by reference.

To produce a substantially continuous coating throughout the entire surface of the pellets, it is generally sufficient to spray 0.02–0.05%, preferably 0.03–0.04%, of molten alkylamine, calculated on the weight of the pellets to be coated.

Preferably the molten alkylamine and the pellets to be coated have such a temperature during the spraying process that the coating to be formed on the pellets remains liquid throughout the entire passage of the pellets through the coating drum, so that, as the pellets are rolling in the drum, this layer may be spread over the pellets' surface as homogeneously as possible. During the spraying treatment, the temperature of the molten alkylamine is preferably 25–30% above the melting point of the amine, and the pellets to be coated preferably have a temperature at least 5° C. higher than the melting point of the amine. The temperature of the pellets must of course not be so high that oxidation can occur.

In the second stage, the coated fertilizer pellets are cooled to a temperature sufficiently low to bring the coating entirely to the solid state. If a single amine has been used for the coating, this means that the pellets are cooled to below the melting point of the amine. If a mixture of amines has been used for the coating, it is preferred for the pellets to be cooled below the melting point of the lowest-melting component of the amine mixture, in order to ensure that the coating of the pellets is fully converted into the solid state.

For cooling the pellets, use can be made with advantage of a stream of air having a suitable temperature, and preferably having such a low moisture content that no moisture can be absorbed on the pellets. Cooling with air can be effected with advantage in a fluid-bed cooler or a rotary drum designed so as to effect a good contact between the stream of air and the pellets. Suitable apparatuses are well-known to those skilled in the art and need not be further described herein.

After the second processing stage, the fertilizer pellets are provided with a substantially continuous, solid coating, which substantially protects the pellets from moisture penetration.

In the third processing stage, the cooled pellets are coated with a layer of a mineral oil which at ambient temperature, for example between 15° and 30° C., can be sprayed hydraulically or with an air sprayer. Highly suitable oils are thin mineral lubricating oils, consisting of mixtures of a major proportion of paraffinic hydrocarbons with minor proportions of aromatic and/or naphthenic hydrocarbons. Preferably an oil is used in which the alkylamine used in the first stage is insoluble, or only poorly soluble, at temperatures below 30° C.

The oil is sprayed over the cooled pellets from the second processing stage in a rotary coating drum, which is preferably of the type described in the above patent application entitled "Coating drum". The oil can be sprayed in a proportion of 0.03–0.15%, preferably 0.05–0.10%, calculated on the weight of the pellets to be coated.

The result of the presence of the oil layer on the pellets is that friction between the pellets during manipulations is reduced to the extent that a dust-free product is formed, while moreover the caking tendency is still further reduced. Indeed, even after much manipulation, the product treated in accordance with the present invention retains its favourable properties: greatly reduced moisture absorption, greatly reduced caking tendency, and no dusting tendency.

The invention is illustrated in and by the following examples.

In the tests described in the examples, the properties of ammonium nitrate containing fertilizer pellets during storage are rated as follows.

The caking tendency is rated by storing the pellets in bags of 50 kg in a space in which the temperature is maintained at a constant value of 27° C., and under a presssure of 0.35 kg/cm$^2$ (a concrete block of 1,000 kg exactly covered the flat side of a 50 kg bag). After a certain storage period, the amount of lumps (caked product) in a bag was determined by carefully placing the bag on a 1 cm mesh screen, carefully cutting open the bag, and carefully removing the cut-open bag. When the screen is lifted the free-flowing pellets flow through the screen; the lumps remaining behind on the screen were collected and weighed. The weight of the lumps was expressed as a percentage of the bag contents (50 kg). Subsequently, blocks of 7×7×5 cm were cut from the lumps, and the weight under which the block broke was determined using a dynamometer. This weight is termed "Hardness" in the examples and is expressed in kg, required to break the block.

Rating:

| Percentage of lumps | |
|---|---|
| 0% | = free flowing |
| < 15% | = good |
| 15–30% | = moderate |
| > 30% | = insufficient |
| Hardness of lumps | |
| < 1 kg | = virtually free flowing |
| < 3 kg | = good |
| 3–5 kg | = moderate caking tendency |
| 5–10 kg | = considerable caking tendency |
| > 10 kg | = hard baked |

The moisture absorption during bulk storage in a humid atmosphere was rated using the Test Procedure of Tennessee Valley Authority's Applied Research Branch=Special Report S 444 (September 1970). For this purpose ammonium nitrate containing fertilizer pellets were stored in amounts of approximately 200 kg in TVA bins, which were placed uncovered in a humid shed. After a given storage period, core samples were taken from these bins, in which the moisture content at different depths was determined. The outward appearance of the stored product was also observed. It is true that, on account of the variations in temperature and relative humidity of the air in the shed, this test does not produce absolute results, but yet it is very suitable for a comparison of different products simultaneously exposed to the same conditions.

The resistance against dusting in conditions in which the pellets are in collision with each other and rub against each other was evaluated using the Test Procedure of Tennessee Valley Authority's Applied Research Branch—Special Report S 444 (September 1970). The principle of this method is based on ball milling the fertilizer pellets in a drum provided with a number of longitudinal partitions and using steel balls.

For testing ammonium nitrate containing pellets the test conditions were aggravated in respect of the following points:
  ball milling period:30 minutes
  drum speed:35 r.p.m.
  ball diameter:8 mm
  number of balls:100
  pellet fraction:2.0–2.5 mm
  amount of pellets:100 g After the test the pellets and the dust formed were sieved to produce a number of fractions.

In order to obtain a judgement of the formation of flydust, a fractionated sieve analysis was performed in the range below 0.5 mm.

In all examples the alkylamine used was a commercially available technical-grade octadecylamine having the following properties:

Gardner colour—3
neutralization index—256-267
flash point—170° C.
melting point—43° C.
specific gravity (50° C.)—0.788
viscosity (70° C.)—2.8 cP

| Composition: | | |
|---|---|---|
| straight chains | $C_{10}$–$C_{12}$ | 1% |
| | $C_{14}$ | 2-4% |
| | $C_{16}$ | 30% |
| | $C_{18}$ | 63-66% |
| | $C_{20}$ | 1-3% |
| amine index ($cm^3$ 0.1 N acid per g amine) | | 36.5-38.5% |

Also, in all examples a commercially available, substantially aliphatic oil having the following properties was used:

| specific gravity 15/15° C. | 0.871 |
|---|---|
| viscosity SUS 38° C. | 108 |
| SUS 99° C. | 39.7 |
| °E 20° C. | 7.2 |
| °E 50° C. | 2.25 |
| aniline point | 91° C. |
| flash point, open cup | 188° C. |
| solidifying point | −12° C. |
| index of refraction (20° C.) | 1.4819 |
| acid number, mg KOH/g | 0.02 |
| carbon type: | |
| aromatic C-atoms | 9.5% |
| naphthenic C-atoms | 23.0% |
| paraffinic C-atoms | 67.5% |
| viscosity index | 94 |

In the examples "low density prills" means prills produced by prilling the melt concerned, with a moisture content of 0.5-3%, followed by drying to a moisture content which is mostly lower than 1%, and "high density prills" means prills produced by prilling the melt concerned, with a moisture content of less than 0.5%, preferably less than 0.2%, without subsequent drying. Low density prills have a rather high porosity, whereas high density prills exhibit only a low porosity.

EXAMPLE I

Low density 26% N calcium ammonium nitrate prills having a moisture content of 0.08% were sprayed in a rotary coating drum with 0.034% molten octadecylamine, calculated on the weight of the prills, to form an uninterrupted coating throughout the entire surface of the prills. During the spraying treatment the prills have a temperature of 60° C. and the octadecylamine a temperature of 90° C. The average residence time of the prills in the coating drum was 7 minutes.

The prills thus coated were cooled in a rotary cooling drum using a stream of air having a temperature of 19° C. and a relative humidity of 40%, to a temperature of 27°–28° C.

The cooled prills were sprayed in a rotary coating drum with different amounts of mineral oil. The temperature of the oil was 25° C.

The prills thus coated were packed in polyethylene bags of 50 kg which were stored for 2 weeks under a pressure of 0.35 kg/cm$^2$ in a space in which a constant temperature of 27° C. was maintained. Subsequently the caking properties of the prills were determined in the manner described above. The results are listed in the following table.

| Test no. | Amine % | Oil % | Lumps % | Hardness lumps, kg |
|---|---|---|---|---|
| 1 | 0.034 | — | 18 | 6 |
| 2 | 0.034 | 0.01 | 13 | 3.2 |
| 3 | 0.034 | 0.05 | 5 | 1 |
| 4 | 0.034 | 0.10 | 3 | 1 |

These results show that the caking tendency of the prills, first coated with amine and subsequently with oil is much less than that of prills coated with amine only.

EXAMPLE II

In tests 5 and 6, high density, 26% N calcium ammonium nitrate prills were coated, first by spraying the prills with 0.035% molten octadecylamine having a temperature of 90° C. in a rotary coating drum, and subsequently by spraying the coated prills with 0.055% mineral oil having a temperature of 25° C., also in a rotary coating drum. The percentages mentioned have been calculated on the weight of the prills.

In test 5, the prills had a temperature of 50° C. as they were sprayed with the amine, and the amine-coated prills were cooled to 27°–28° C., in the manner described in Example I, before being coated with oil.

In test 6, the prills had a temperature of 27° C. during the spraying treatment with the amine, and the amine-coated prills were coated with oil without cooling also at 27° C.

The products of tests 5 and 6 were packed in polyethylene bags of 50 kg, which were stored for 2 months under a pressure of 0.35 kg/cm$^2$ in a space in which a constant temperature of 27° C. was maintained. Subsequently the caking properties of the prills were determined in the manner described above. The results are listed in the following table.

| Test no. | Lumps | Hardness of lumps, kg |
|---|---|---|
| 5 | 9 | <1 |
| 6 | 35 | 5.7 |

The caking properties of the prills treated in accordance with the present invention, and produced in test 5, in which the prills had a temperature above the melting point of the octadecylamine as they were being sprayed with molten octadecylamine were considerably better than those of the product produced in test 6, in which the prills were sprayed at 27° C., i.e., below the melting point of the octadecylamine. Also, the distribution of the octadecylamine over the surface of the prills was much more homogeneous in the product of test 5 than it was in the product of test 6, as was shown by adding 1% aromatic oil to the octadecylamine and observing the fluorescence under a UV-lamp.

EXAMPLE III

In this example the effect of the separate coating of calcium ammonium nitrate prills with octadecylamine and oil is compared with the prior process of coating the prills with a mixture of octadecylamine and oil.

In test 7, low density 26% N calcium ammonium nitrate prills having a temperature of 65° C. were sprayed in a rotary coating drum with 0.035% by weight of molten octadecylamine having a temperature of 90° C., whereafter the prills thus coated were cooled to 27°-28° C. in the manner described in Example I, and subsequently sprayed with 0.065% by weight of mineral oil at that temperature in a rotary coating drum.

In test 8, prills of the same type and having a temperature of 27° C. were sprayed in a rotary coating drum with a mixture of octadecylamine and mineral oil having a temperature of 90° C., whereby the granules were coated with 0.03% by weight of amine and 0.15% by weight of oil.

Samples of the products obtained in tests 7 and 8 were packed in polyethylene bags of 50 kg, which were stored for 1 month under a pressure of 0.35 kg/cm² in a space in which a constant temperature of 27° C. was maintained. Subsequently the caking properties of the prills were determined in the manner described above. The results are listed in the following table.

| Test no. | Lumps | Hardness of lumps kg |
|---|---|---|
| 7 | 10 | 1.0 |
| 8 | 42 | 2.2 |

The remainders of the products produced in tests 7 and 8 were poured in bulk piles of 3,000 ton in a shed. After 14 days, the product of test 7 was still virtually free flowing, but the product of test 8 consisted of a coherent mass which was difficult to handle. During transfer of the product of test 8 there was a fine ambient dust cloud. Analysis showed that the dust contained 3-5% amine. During transfer of the product of test 7, the shed remained free of dust.

EXAMPLE IV

This example shows the effect of the manner of coating on the storage properties of high-density calcium ammonium nitrate prills when stored in bulk and exposed to humid climatologic conditions.

In test 9, prills with a moisture content of 0.08% were sprayed in a rotary coating drum at 50° C. with a mixture of octadecylamine and mineral oil to coat the prills with 0.03% by weight of amine and 0.06% by weight of oil. Subsequently the prills were cooled to 27°-27° C.

Test 10 only differed from test 9 in that the prills had a temperature of 27°-28° C. during the spraying treatment.

In test 11, prills of the same type were first sprayed in a rotary coating drum at 50° C. with 0.03% by weight of molten octadecylamine having a temperature of 90° C., subsequently cooled, in the manner described in Example I, to 27°-28° C., and then sprayed at that temperature in a rotary coating drum with 0.06% by weight of mineral oil.

The products of tests 9, 10 and 11 were stored in TVA-bins, which were placed in a damp shed.

After a 5-week storage period, the appearance of the products was observed, and the moisture content was determined at different depths. Also the condition of the products was determined. The results are listed in the following table.

| | Test 9 | Test 10 | Test 11 |
|---|---|---|---|
| Appearance | 0.5 cm thick top layer of leached-out prills | | |
| Moisture content % by weight | | | |
| at 2 cm below top layer | 0.81 | 1.07 | 0.54 |
| at a depth of 5 cm | 1.12 | 0.77 | 0.47 |
| at a depth of 10 cm | 0.95 | 0.51 | 0.22 |
| at a depth of 15 cm | 0.44 | 0.41 | 0.20 |
| Condition | difficult to handle greatly coherent | hard and moist "block" | under a crust of 2 cm the product was free-flowing |

These results show that the process according to the present invention (test 11) better prevents moisture penetration than prior processes in which ammonium nitrate containing fertilizer pellets are coated with a mixture of alkylamine and oil.

EXAMPLE V

In tests 12-16, high density 33.5% N ammonium nitrate prills were coated in different ways, and the dusting tendency in conditions of mutual attrition of the pellets was determined in accordance with the TVA testing method described above.

In test 12, the prills were not coated (control).

In test 13, prills with a temperature of 27°-28° C. were sprayed in a rotary coating drum with 0.06% mineral oil having a temperature of 25° C. The residence time in the drum was 7 minutes. This residence time was applied in all of the tests 12-16.

In test 14, prills having a temperature of 70° C. were sprayed in a rotary coating drum with 0.03% octadecylamine having a temperature of 90° C. The prills thus coated were cooled to 27°-28° C. in a fluid bed cooler, using a stream of air having a temperature of 20° C. and a relative humidity of approximately 40%.

In test 15, prills having a temperature of 70° C. were sprayed in a rotary costing drum with a mixture of 0.03% octadecylamine and 0.06% mineral oil having a temperature of 90° C. The prills thus coated were cooled to 27°-28° C. in a fluid bed cooler, using a stream of air of 20° C. and having a relative humidity of approximately 40%.

In test 16, prills having a temperature of 70° C. were sprayed in a rotary coating drum with 0.03% octadecylamine having a temperature of 90° C. The prills thus coated were cooled to 27°-28° C. in a fluid bed cooler, using a stream of air of 20° C. and having a relative humidity of approximately 40%. The cooled prills were sprayed in a rotary coating drum with 0.06% mineral oil having a temperature of 25° C.

The products of tests 12-16 were subjected to the TVA "Abrasion and shatter resistance" testing procedure. The results are listed in the following table. These results clearly show the greatly reduced tendency of forming dust and in particular fine dust having a particle size less than 0.02 mm, of the product of test 16, which was treated in accordance with the present invention.

| Test no. | nature of coating | 0.2 mm % | 0.2–0.5 mm % | 0.5–2.0 mm % | < 2 mm % | > 2 mm % |
| --- | --- | --- | --- | --- | --- | --- |
| 12 | none | 0.57 | 0.42 | 26.2 | 27.2 | 72.8 |
|  |  | 0.51 | 0.80 | 23.3 | 24.6 | 75.4 |
| 13 | 0.06 % oil | 0.49 | 1.09 | 26.1 | 27.7 | 72.3 |
|  |  | 0.45 | 1.01 | 25.9 | 27.4 | 72.6 |
| 14 | 0.03 % amine on prills of 70° C. | 0.20 | 0.49 | 13.8 | 14.5 | 85.5 |
|  |  | 0.21 | 0.38 | 12.1 | 12.7 | 87.3 |
| 15 | a mixture of 0.03% amine + 0.06% oil on prills of 70° C. | 0.37 | 0.52 | 19.5 | 20.5 | 79.5 |
|  |  | 0.41 | 0.57 | 18.3 | 19.4 | 80.6 |
| 16 | 0.03% amine on prills of 70° C. - cooling - 0.06% oil on prills of 28° C. | 0.02 | 0.26 | 8.0 | 8.3 | 91.7 |
|  |  | 0.05 | 0.32 | 9.6 | 10.0 | 90.0 |
|  |  | 0.06 | 0.29 | 10.0 | 10.3 | 89.7 |
|  |  | 0.10 | 0.29 | 8.6 | 9.0 | 91.0 |

We claim:

1. Ammonium nitrate containing fertilizer pellets having improved properties during storage and transportation, characterized in that the individual fertilizer pellets have a uniform and substantially continuous coating of $C_{12}$–$C_{18}$ alkylamine(s) in the solid state throughout their entire surface, and a thin layer of mineral oil over said coating.

2. A process for making fertilizer pellets according to claim 1, comprising, in succession,
   1. a first stage in which ammonium nitrate containing fertilizer pellets are coated with a uniform and substantially continuous layer of molten $C_{12}$–$C_{18}$ alkylamine(s);
   2. a second stage in which the pellets are cooled to a temperature sufficiently low to convert the coating entirely into the solid state;
   3. and a third stage, in which the pellets are coated with a thin layer of mineral oil.

3. A process according to claim 2, in which, in the first stage, the alkylamine melt is sprayed over the fertilizer pellets, the temperature of which pellets is above the melting point of the amine or mixture of amines.

4. A process according to claim 2, wherein the alkylamine used is technical-grade octadecylamine.

5. A process according to claim 2, wherein the fertilizer pellets are sprayed with 0.02–0.05% alkylamine, calculated on the weight of the pellets to be coated.

6. A process according to claim 2, wherein, in the first stage, the temperature of the molten alkylamine is 25°–30° C. above the melting point of the amine or mixture of amines during the spraying treatment.

7. A process according to claim 3, wherein, in the first stage, the temperature of the fertilizer pellets is at least 5° C. above the melting point of the amine or mixture of amines.

8. A process according to claim 2, wherein the fertilizer pellets are cooled in the second stage by means of a stream of air having a moisture content so low as to preclude moisture absorption on the pellets.

9. A process according to claim 2, wherein the mineral oil used in the third stage is capable of being sprayed hydraulically or by means of an air sprayer at ambient temperature.

10. A process according to claim 2, wherein the fertilizer pellets are sprayed in the third stage with 0.03–0.15% of mineral oil, calculated on the weight of the pellets to be coated;

11. A process according to claim 2, which comprises using a mineral oil which at temperatures below 30° C. does not dissolve the alkylamine used in the first stage, or a small quantity thereof only.

* * * * *

UNITED STATES PATENT AND TRADEMARK OFFICE
CERTIFICATE OF CORRECTION

PATENT NO. : 4,150,965
DATED : April 24, 1979
INVENTOR(S) : Van Hijfte, et al.

It is certified that error appears in the above-identified patent and that said Letters Patent are hereby corrected as shown below:

Col. 5, line 8, "170°C" should read as -- $>$ 170°C --

Col. 10, line 39, Claim 11, "2" should read as -- 10 --.

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*